United States Patent
Mork et al.

(10) Patent No.: US 7,702,245 B1
(45) Date of Patent: Apr. 20, 2010

(54) SPREAD SPECTRUM IN-BAND UTILITY COMMUNICATION CHANNEL

(75) Inventors: Goran Mork, Stocksund (SE); Johan Martensson, Stockholm (SE); Dan Wahlbeck, Stockholm (SE)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/393,317

(22) Filed: Feb. 26, 2009

Related U.S. Application Data (63) Continuation of application No. 09/931,073, filed on Aug. 15, 2001, now abandoned.

(51) Int. Cl.
*H04B 10/04* (2006.01)

(52) U.S. Cl. .......................... 398/183; 398/77; 398/78; 398/99; 398/202; 398/141; 375/130; 375/146; 375/147; 370/522; 370/524; 370/529; 381/4

(58) Field of Classification Search .............. 398/182, 398/183, 184, 185, 186, 187, 188, 189, 190, 398/191, 192, 193, 194, 202, 208, 209, 210, 398/211, 214, 77, 78, 79, 141, 154, 155, 398/158, 159, 163, 135, 136, 128, 130, 99, 398/100; 375/130, 146, 147, 260; 370/522, 370/524, 529; 381/4

See application file for complete search history.

(56) References Cited

U.S. PATENT DOCUMENTS

| | | | |
|---|---|---|---|
| 5,416,623 A | 5/1995 | Dawson et al. |
| 5,513,029 A | 4/1996 | Roberts |
| 5,515,196 A | 5/1996 | Kitajima et al. |
| 5,841,776 A | 11/1998 | Chen |
| 5,937,000 A | 8/1999 | Lee et al. |
| 6,025,944 A | 2/2000 | Mendez et al. |
| 6,616,352 B1 | 9/2003 | Shigeta et al. |
| 6,922,431 B1 | 7/2005 | Weber et al. |

*Primary Examiner*—Hanh Phan

(57) ABSTRACT

Utility data modulation is superimposed on a payload data modulator optical signal by exploiting spread spectrum techniques by virtue of one embodiment of the present invention. Utility data transmission rates of e.g., 200 Kbps, can be achieved without impairment to payload data transmission. The utility data modulated signal spectrum overlaps or is entirely within the payload data modulation spectrum, therefore, overcoming problems with optical amplifier gain control and pink noise.

28 Claims, 6 Drawing Sheets

SPREAD SPECTRUM IN-BAND UTILITY COMMUNICATION CHANNEL

CROSS REFERENCE TO RELATED APPLICATIONS

This application is a continuation of U.S. patent application Ser. No. 09/931,073 filed Aug. 15, 2001, entitled "Spread Spectrum In-Band Communication Channel," the entire contents of which are hereby incorporated by reference.

BACKGROUND OF THE INVENTION

The present invention relates to optical communication systems and more particularly to systems and methods for communicating management information via optical links.

The explosion of communication services, ranging from video teleconferencing to electronic commerce is providing rapid growth of Internet traffic. To cope with the rising volume of Internet traffic, service providers are more and more relying on optical technology both in the core network and as a way of accessing network users. To obtain a multiplicative increase in capacity, wavelength division multiplexing (WDM) techniques are being employed where multiple optical signals having disparate wavelengths share the same fiber.

Proper operation of an optical network requires that in addition to payload data, optical links should preferably also carry utility data, e.g., system management information. The utility data may include signal strength information, environmental parameters such as temperature, etc. One prior art approach to carrying utility data across an optical link is to allocate a wavelength to an optical signal modulated with only utility data. This represents a tremendous waste of the optical components needed to receive, transmit, and otherwise process the optical signal because a single wavelength may well be capable of carrying, e.g., 2.5, 10, or more Gbps of payload data for which the service provider could earn revenue whereas the data rate of the utility data may be quite low.

An alternative approach is to modulate an optical signal on a single wavelength with both the payload data and the utility data by use of frequency domain multiplexing. This is presently done using amplitude modulation for both data streams. The transmission of utility data takes advantage of the unoccupied sections of the spectrum of the payload data modulated optical signal. For example, in one approach, both a 5.7 Kbps utility data stream and a 10 Gbps payload data stream amplitude modulates the optical carrier signal. The spectrums of the utility data and of the payload data do not overlap and they may be separated at the receiver using filters.

This latter approach also carries serious drawbacks. For example, it would be desirable to transmit optical equipment firmware updates via the utility data channel. However, the spectrum left unoccupied by the payload data modulation is insufficient to accommodate the data rate necessary for timely transmission of firmware upgrades. Furthermore, the low frequency of the utility data modulation may be within the loop bandwidth of optical amplifier regulation along the link causing optical amplifier gain to undesirably vary in response to the utility data stream. Also, if the flow of payload data ceases for some reason, the optical signal may be subject to superimposed pink (1/f) noise that would swamp the baseband utility data.

What is needed are systems and methods for combining utility data and payload data on an optical communication link such that link capacity is used efficiently, the utility data transmission rate is sufficient to support software upgrades, and problems inherent with relying on baseband transmission of utility data are overcome.

SUMMARY OF THE INVENTION

Utility data modulation is superimposed on a payload data modulated optical signal by exploiting spread spectrum techniques by virtue of one embodiment of the present invention. Utility data transmission rates of e.g., 200 Kbps, can be achieved without impairment to payload data transmission. The utility data modulated signal spectrum overlaps and may be entirely within the payload data modulation spectrum, thereby overcoming problems with optical amplifier gain control and pink noise.

According to a first aspect of the present invention, a method for superimposing utility data on an optical signal includes: receiving utility data from a utility data source, spreading the utility data according to a spreading code to generate a spread spectrum signal, and modulating the optical signal with a combination of the spread spectrum signal and a signal carrying payload data.

According to a second aspect of the present invention, a method for recovering utility data from an optical signal includes: accepting as input the optical signal modulated with payload data and the utility data, multiplying an electrical signal derived from the optical signal by a spreading sequence to recover the utility data where the electrical signal carries both the payload data and the utility data, and recovering the payload data from the optical signal.

According to a third aspect of the present invention, apparatus for superimposing utility data on an optical signal includes: a spread spectrum processing block that spreads the utility data using a spreading sequence to generate a spread spectrum signal, and a modulation system that modulates the optical signal using both the payload data and the utility data as spread by the spread spectrum processing block.

According to a fourth aspect of the present invention, apparatus for recovering utility data from an optical signal includes: an input that accepts the optical signal modulated with payload data and the utility data and a spread spectrum processing block that uses a spreading sequence to recover the utility data from an electrical signal derived from the optical signal.

Further understanding of the nature and advantages of the inventions herein may be realized by reference to the remaining portions of the specification and the attached drawings.

DESCRIPTION OF SPECIFIC EMBODIMENTS

The present invention will now be described with reference to an example optical communication system employing wavelength division multiplexing (WDM) techniques wherein multiple optical signals having disparate wavelengths are combined on a single fiber. At least one of the wavelengths is allocated for communication of both payload data and utility data. Utility data pertains to operation of the network itself rather than to the services provided by the network. Examples of utility data include optical signal strength information pertaining to various points of the network, environmental parameters including temperature, firmware code for updating communication equipment forming a part of the network, etc.

The present invention will be described with reference to a node capable of transmitting and/or receiving payload and utility data on the same wavelength. The node may be connected in a ring with other nodes. This application is merely representative and the present invention will find application in other systems, such as single wavelength optical communication links, point-to-point WDM links, etc.

According to one embodiment of the present invention, the utility data stream to be modulated onto the optical signal is processed in accordance with direct sequence spread spectrum techniques. The utility data stream is multiplied by a predetermined pseudo-random noise sequence having a clock rate of $2^{N-1}$ times the data rate of the utility data stream. The effect of this is that the bandwidth occupied by the utility data is multiplied by $2^N$. The spread spectrum signal resulting from spreading of the utility data is then combined with the payload data to modulate the optical signal. Considering the overall spectrum of the modulated optical signal, the spectrum occupied by the payload data modulation and the spectrum occupied by the utility data modulation overlap. In one embodiment, the utility data spectrum is wholly contained within the payload data spectrum.

The spread spectrum signal is preferably weighted to have an amplitude of 5% or less compared to the payload data amplitude. This leads to 0.2 db loss or less in the payload data signal strength.

At the receiver, the payload data is recovered according to known amplitude modulation techniques and appropriate decoding techniques. From the viewpoint of the payload data receiver, the spread spectrum utility data signal represents a tolerable level of noise having a nearly rectangular probability distribution. A spread spectrum receiver system having knowledge of the spreading code used for transmission multiplies the received signal by the spreading sequence to recover the utility data.

Figure 1:
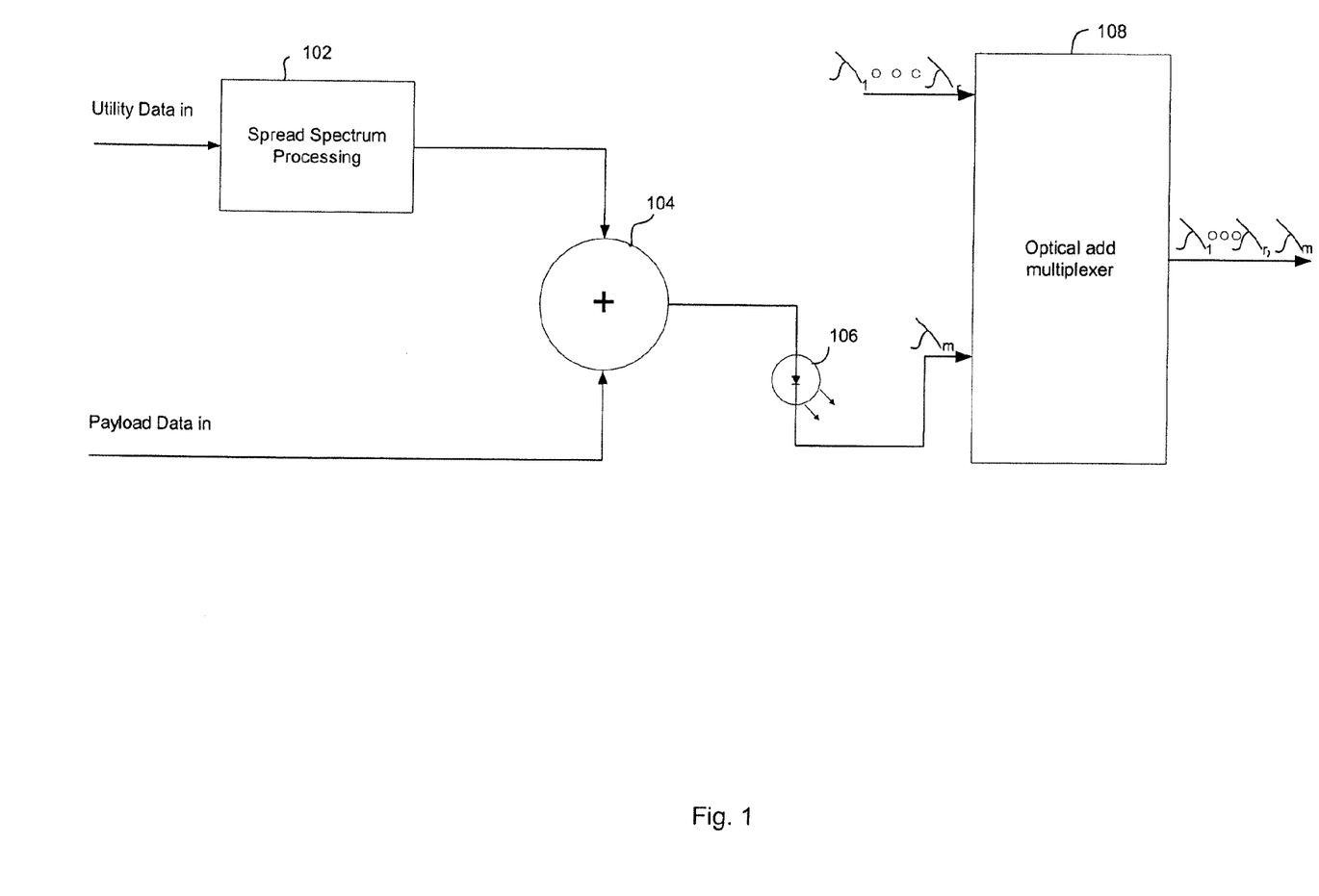
FIG. 1 depicts apparatus for combining payload data modulation and utility data modulation using spread spectrum techniques according to one embodiment of the present invention.

FIG. 1 depicts apparatus for combining utility data modulation and payload data modulation on the same optical signal according to one embodiment of the present invention. Utility data from a utility data source is input to a spread spectrum processing block 102. Spread spectrum processing block 102 applies a spreading code to broaden or spread the spectrum of the utility data and thereby generate a spread spectrum signal. In one embodiment, the utility data stream has a bit rate of 200 Kbps while the rate of the spreading sequence, referred to as the chip rate, is approximately 102.4 Mchip/sec. Each utility data bit is thus effectively split into $2^8$ parts. The 200 Kbps data rate is sufficient to support, e.g., delivery of firmware by its inclusion in the utility data stream.

In an exemplary modulation system, a summer 104 combines the spread spectrum signal with the payload data. Conversion from digital to analog may be before or after summer 104. The spread spectrum signal is scaled to have an amplitude 5% of that of the payload data signal. Optionally, forward error correction (not shown) encoding may be applied to the spread spectrum signal. The sum of the utility data spread spectrum signal and the payload data is used to drive a laser 106 that generates the optical signal which is thereby modulated with both the utility data and the payload data. This modulated signal is at wavelength $\lambda_m$. An optical add multiplexer 108 receives a WDM signal having wavelengths components $\lambda_1$ through $\lambda_r$ and also receives the output of laser 106. Optical add multiplexer 108 outputs a combined signal including the wavelength components received via both inputs.

Figure 2:
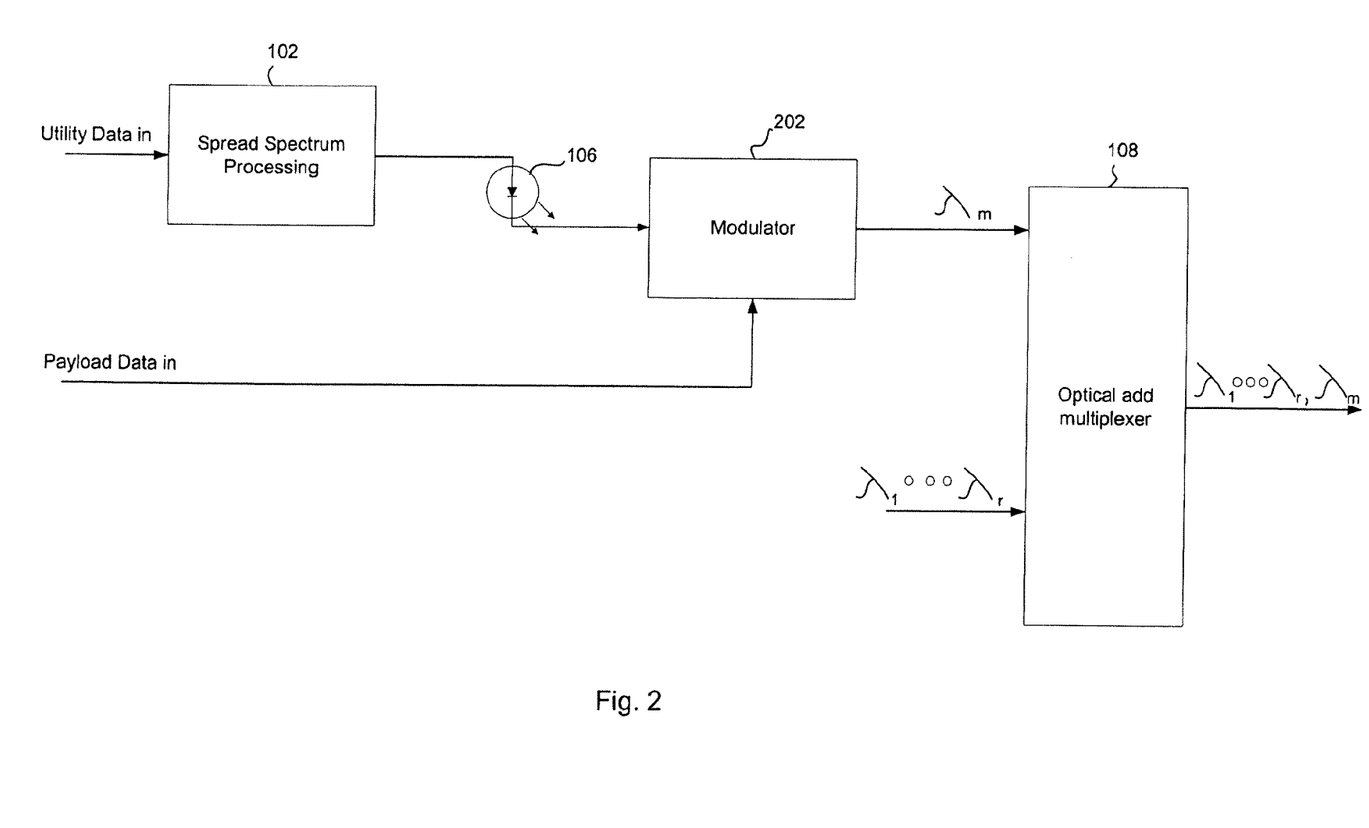
FIG. 2 depicts apparatus for combining payload data modulation and utility data modulation using spread spectrum techniques according to an alternative embodiment of the present invention.
Figure 6:
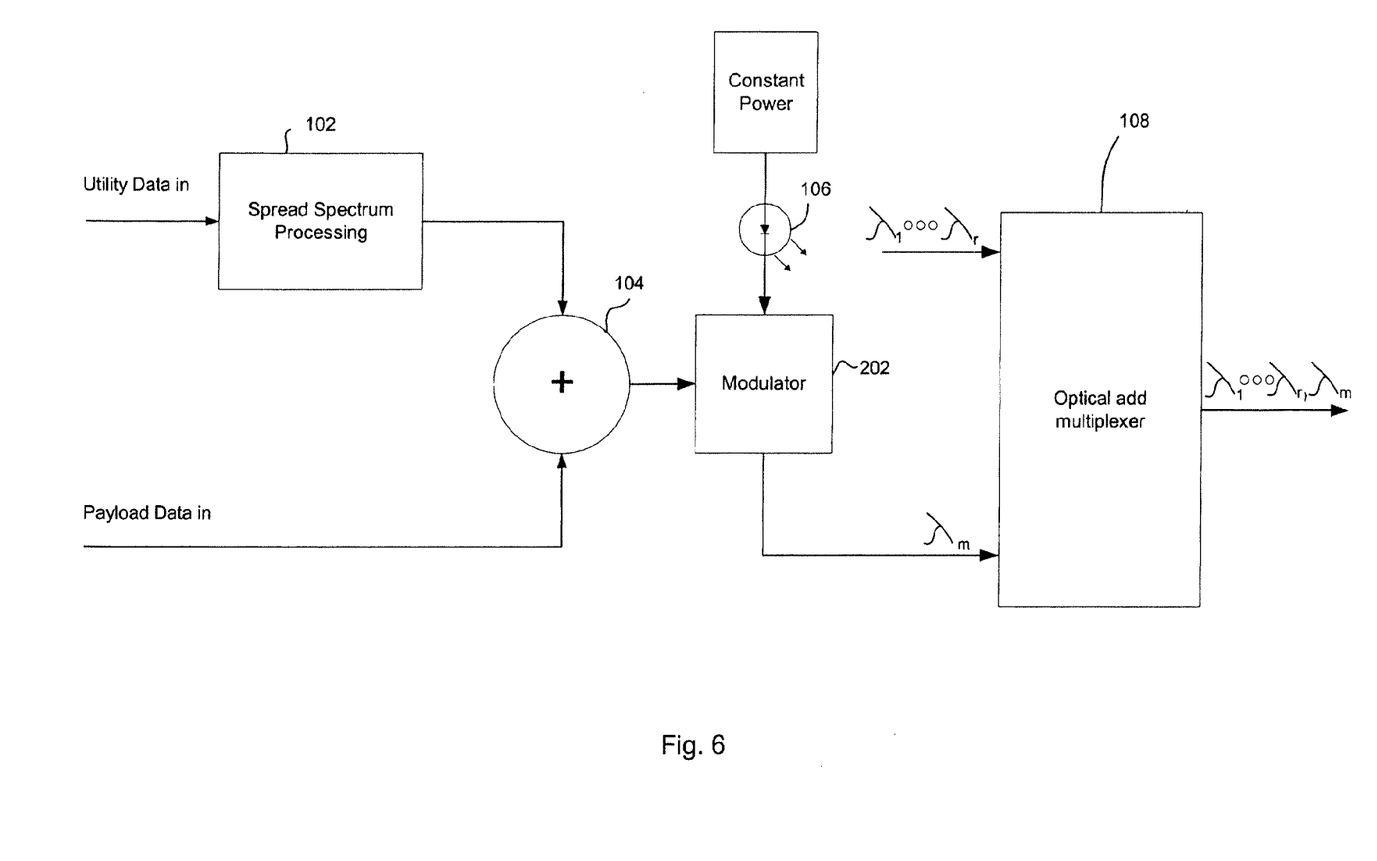
FIG. 6 depicts apparatus for combining payload data modulation and utility data modulation using spread spectrum techniques according to another embodiment of the present invention.

FIG. 1, however, only represents one example of how the utility data spread spectrum signal and the payload data may be combined. FIG. 2 depicts an alternative scheme for combining the utility data spread spectrum modulation and payload data modulation. The scheme of FIG. 2 is particularly useful where the payload data has a very high bit rate such as 10 Gbps or more and it is not practical to use the payload data to directly vary the output power of laser 106. Accordingly, an alternate modulation system is employed. The spread spectrum signal output by spread spectrum processing block 102 is used to drive the input to laser 106 without summing in the payload data signal. The current input to laser 106 is appropriately scaled in accordance with the operating parameters of the laser. The optical output of laser 106 is input to an optical modulator 202 such as a lithium niobate modulator as known in the art. The modulation input to modulator 202 is fed by the payload data. It would also be possible, according to the present invention, to combine the payload data and the utility data spread spectrum signal using a summer and then use this sum as the modulation input to modulator 202 while maintaining the input signal to laser 106 at constant power, as illustrated in FIG. 6.

Figure 3:
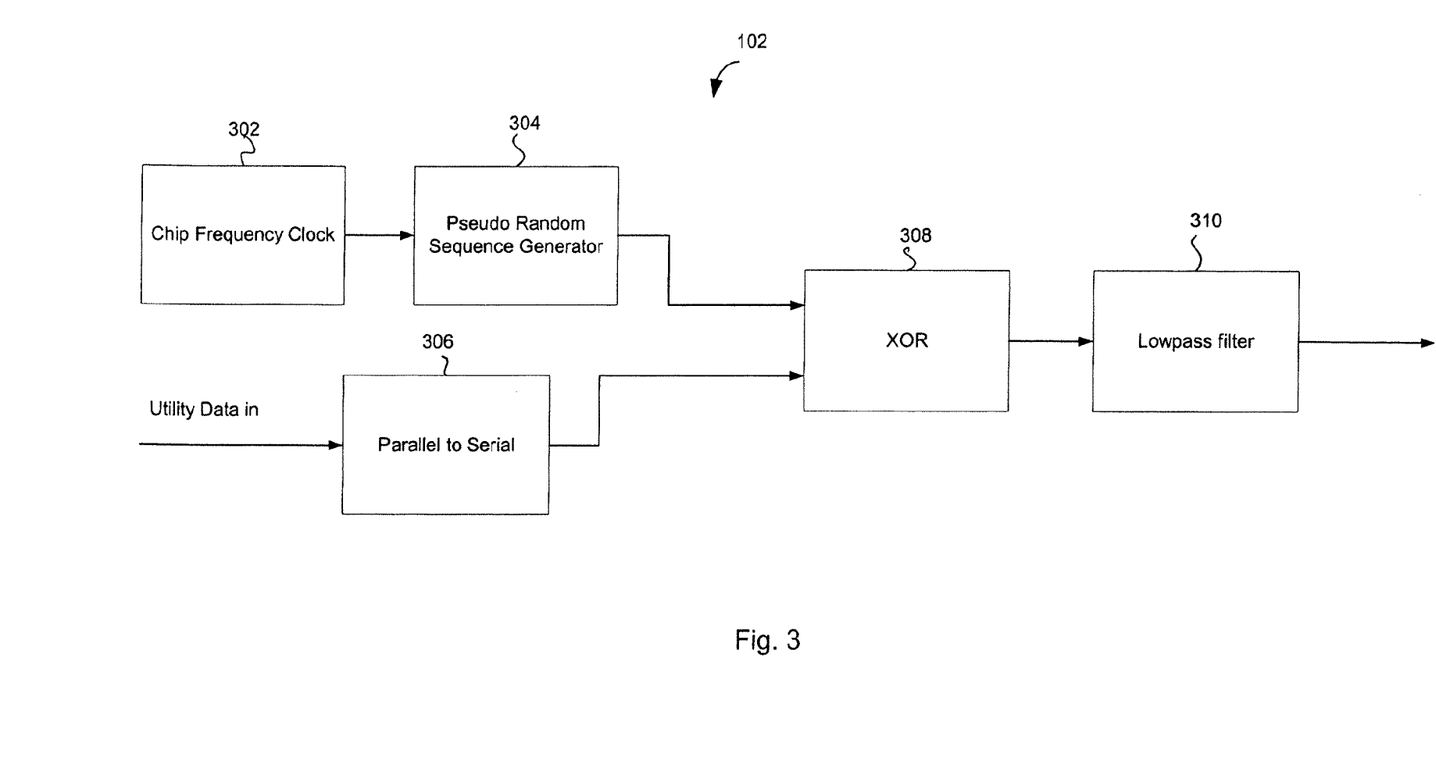
FIG. 3 depicts details of a spread spectrum processing block used to process utility data according to one embodiment of the present invention.

FIG. 3 depicts details of spread spectrum processing block 102 according to one embodiment of the present invention. A chip frequency clock 302 outputs clock pulses at the chip frequency, i.e., the rate of the pseudo-random spreading sequence. A pseudo-random sequence generator 304 generates the spreading sequence while being clocked by chip frequency clock 302. Generator 304 may, for example, be a feedback shift register structure having a design that is also known at the receiver that will recover the utility data. The utility data is input to a parallel to serial converter 306 and the serial utility data is XOR'ed with a spreading sequence by an XOR circuit 308 that is also clocked at the chip rate. The output of XOR circuit 308 is low pass filtered by a low pass filter 310 that preferably has a bandwidth of approximately 0.7 times the chip clock rate.

Figure 4:
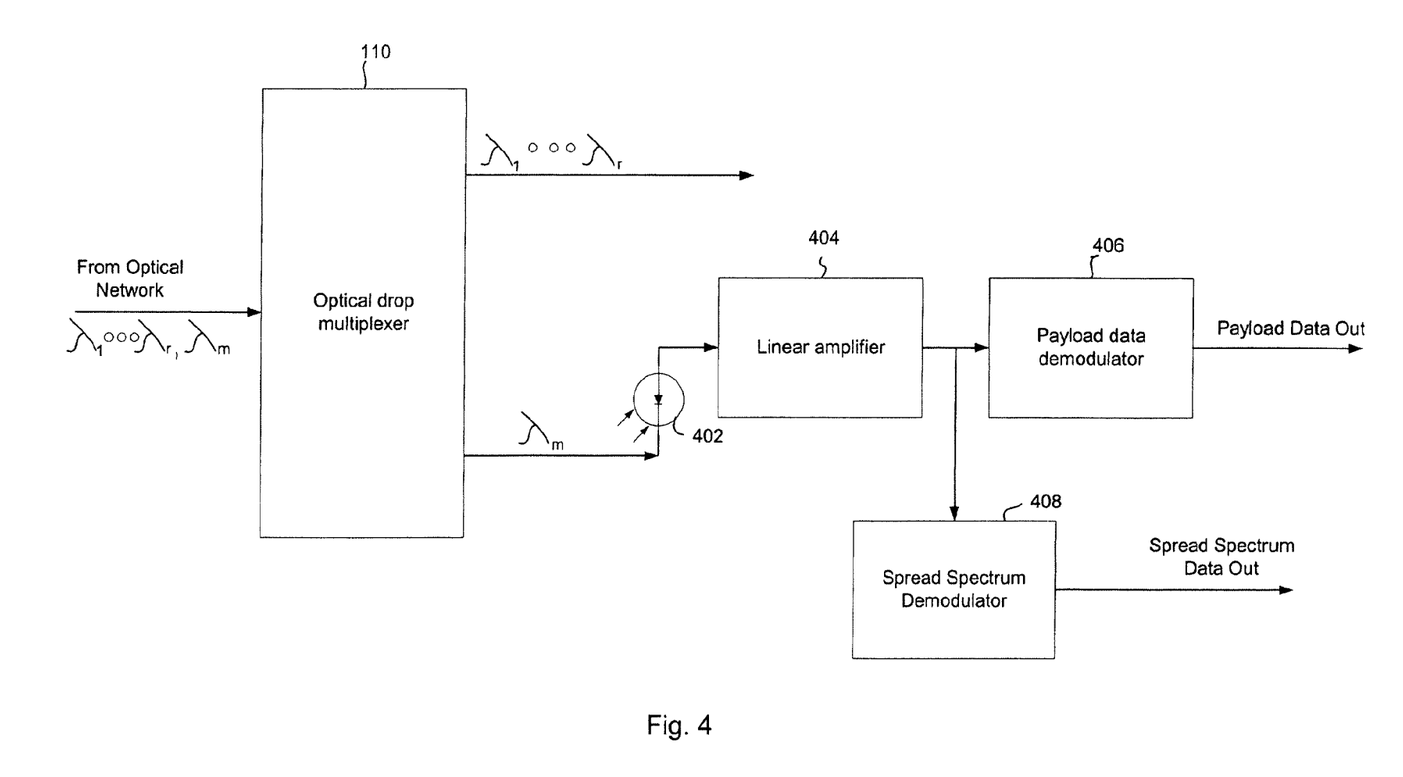
FIG. 4 depicts apparatus for recovering spread spectrum utility data from a received optical signal according to one embodiment of the present invention.

FIG. 4 depicts apparatus for recovering utility data from an optical signal carrying both payload data and utility data according to one embodiment of the present invention. An optical drop multiplexer 110 receives a WDM signal including wavelength components $\lambda_1$ through $\lambda_r$ including a component at wavelength $\lambda_m$ that has been modulated elsewhere with both payload data and utility data as described with reference to FIGS. 1-3. Optical drop multiplexer 110 isolates this $\lambda_m$ component from the others.

A photodetector 402 converts the $\lambda_m$ optical signal to an electrical signal. The electrical signal is amplified by a linear amplifier 404. The electrical signal includes both a payload data signal and a spread spectrum utility data signal that appears as noise superimposed on the payload data. A payload data demodulator 406 is implemented as known in the art in any suitable manner and recovers the payload data carried by the optical signal.

The amplified electrical signal is also passed to a spread spectrum demodulator 408. For correct operation of spread spectrum demodulator 408, it is preferable that there be no prior limiter stage. Spread spectrum demodulator 408 is aware of the spreading sequence used for transmission of the utility data and uses this information to recover the utility data in accordance with spread spectrum demodulation techniques in any suitable manner.

Figure 5:
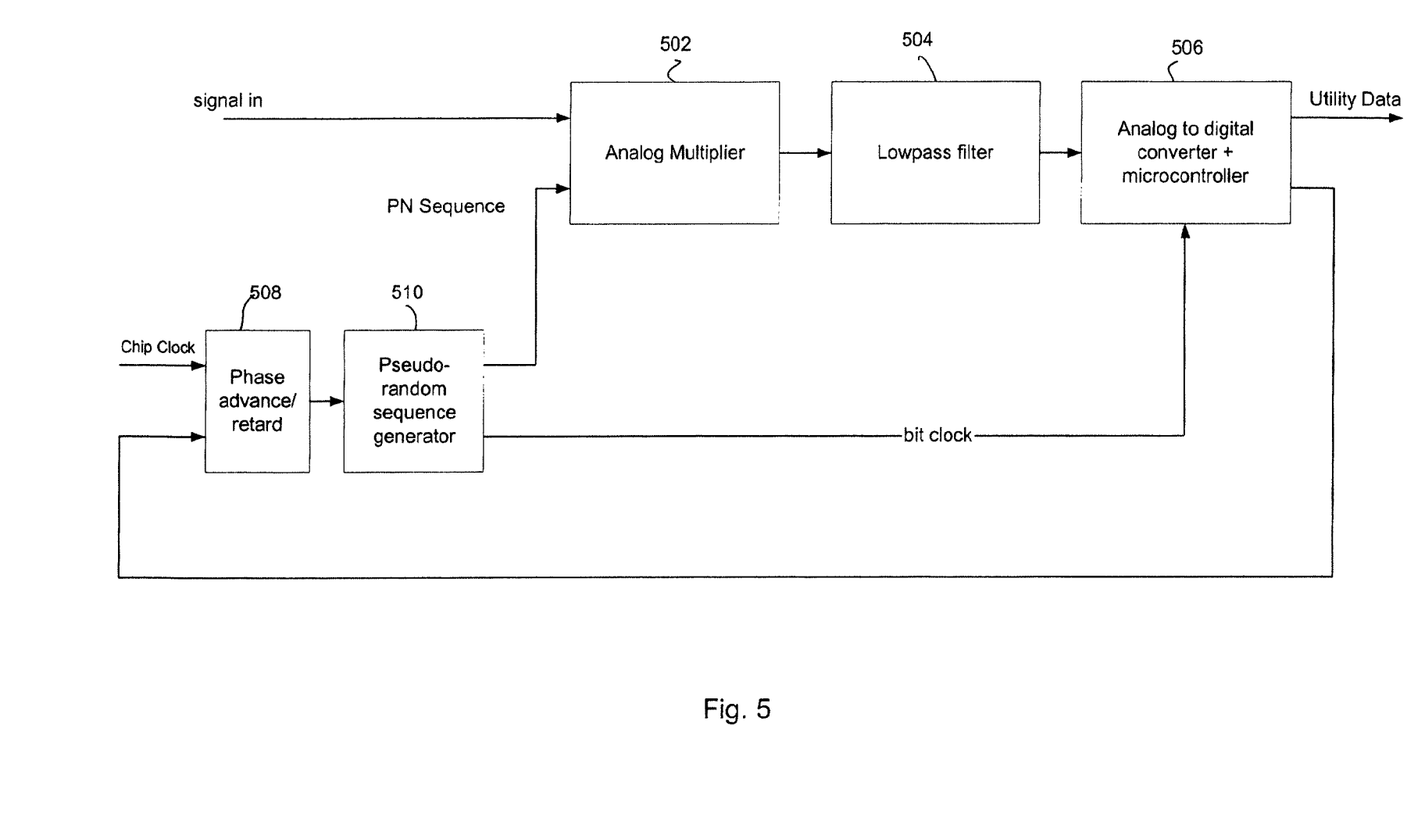
FIG. 5 depicts details of a spread spectrum demodulator used in the system of FIG. 4 according to one embodiment of the present invention.

FIG. 5 depicts one embodiment of spread spectrum demodulator 408 as implemented by a delay lock loop. An analog multiplier 502 multiplies the amplified electrical signal by the spreading sequence as output by a pseudo-random sequence generator 510. The output of analog multiplier 502 is filtered by a low pass filter 504 having a bandwidth roughly comparable to the utility data bit rate. A block 506 converts the analog output of filter 504 to digital form and also incorporates a microcontroller. Block 506 implements a correlator that adjusts the phase of the spreading sequence until a peak is achieved indicating alignment of the spreading sequence to the incoming signal. The phase is adjusted by signaling to a phase advanced/retard block 508. Block 508 sets the spreading sequence phase by delaying the chip clock as input to pseudo-random sequence generator 510. Once the incoming signal is locked to the spreading sequence, the utility data is available at the output of block 506.

Pseudo-random sequence generator 510 is configured to output the same spreading sequence as used in transmission of the utility data. For example, pseudo-random sequence generator 510 may incorporate the same linear feedback shift register structure used at the transmit end.

In the example system where each bit is multiplied by a sequence of 256 chips, the coding gain of the receiver is approximately 27 dB. The signal to noise ratio for the utility data is then approximately 14 dB, adequate for optimal reception. Additional robustness to noise may be provided by FEC encoding the utility data on the transmitter end and then decoding on the receiver end.

The systems and methods of the present invention allow for higher utility data rates with little impact on payload data transmission performance. Furthermore, because the utility data spectrum overlaps the payload data spectrum and may be entirely contained within the payload data spectrum, impairments due to susceptibility of utility data transmission to either pink noise or undesirable interaction between the modulation envelope with optical amplifier gain control loops may be substantially reduced.

It is understood that the examples and embodiments that are described herein are for illustrative purposes only and various modifications are changes in light thereof will be suggested to persons skilled in the art and are to be included within the spirit and purview of this application and scope of the appended claims and their full scope of equivalents.

The invention claimed is:

1. In an optical communication transmitter system, a method for superimposing utility data on an optical signal, said method comprising:
   receiving utility data from a utility data source;
   spreading said utility data according to a spreading code to generate a spread spectrum signal, wherein spreading comprises:
   generating a chip clock at a chip frequency corresponding to a rate of a pseudo-random spreading sequence;
   generating a spreading sequence based on the chip clock;
   converting the utility data to a serial utility data stream with a parallel to serial converter; and
   at a rate corresponding to the chip clock rate, exclusive-OR combining the serial utility data stream with the spreading sequence to produce the spread spectrum signal; and
   modulating said optical signal with a combination of said spread spectrum signal and a signal carrying payload data.

2. The method of claim 1 wherein modulating comprises:
   adding said spread spectrum signal to said payload data signal to form a modulation signal; and
   applying said modulation signal to input of an optical modulator that modulates said optical signal.

3. The method of claim 1 wherein modulating comprises:
   adding said spread spectrum signal to said payload data signal to form a modulation signal; and
   driving a laser using said modulation signal so that said laser outputs said optical signal modulated with both said payload data and said utility data.

4. The method of claim 1 wherein modulating comprises driving a laser using said spread spectrum signal;
   modulating output of said laser using said payload data signal.

5. The method of claim 1 wherein generating the chip clock comprises generating a clock signal having a clock rate of $2^{N-1}$ times a data rate of the utility data stream.

6. The method of claim 1 wherein modulating comprises weighting the spread spectrum signal to have an amplitude that is approximately 5% or less of an amplitude of the signal carrying payload data.

7. The method of claim 1 further comprising:
   outputting a modulated optical signal wherein modulation due to said payload data and modulation due to said utility data overlap spectrally.

8. The method of claim 1, and further comprising generating a utility data stream comprising the utility data, wherein a bit rate of the utility data stream is 200 Kbps sufficient to contain delivery of firmware, and a rate of the spreading code is 102.4 Mchip/sec, and wherein said spreading results in splitting each utility data bit into 28 parts.

9. The method of claim 1, wherein spreading further comprises filtering the spread spectrum signal with a low pass filter that has a bandwidth of approximately 0.7 times a rate of the chip clock.

10. In an optical communication receiver, a method for recovering utility data from an optical signal, said method comprising:
    accepting as input an optical signal modulated with payload data and said utility data;
    generating a spreading sequence on the basis of a chip clock;
    multiplying an electrical signal derived from said optical signal by the spreading sequence to produce an analog signal, said electrical signal carrying both said payload data and said utility data;
    converting the analog signal to a digital signal;
    analyzing the digital signal with a correlator process to produce a phase adjustment that adjusts a phase of the spreading sequence until a peak is achieved indicating alignment of the spreading sequence to the electrical signal;
    adjusting a phase of the chip clock based on the phase adjustment; and
    recovering said payload data from said optical signal.

11. The method of claim 10 and further comprising recovering a signal strength indication contained in the utility data.

12. The method of claim 10 and further comprising recovering firmware contained in the utility data.

13. In an optical communication transmitter system, an apparatus for superimposing utility data on an optical signal, said apparatus comprising:
   means for receiving utility data from a utility data source;
   means for spreading said utility data according to a spreading code to generate a spread spectrum signal, wherein said means for spreading comprises:
      means for generating a chip clock at a chip frequency corresponding to a rate of a pseudo-random spreading sequence;
      means for generating a spreading sequence based on the chip clock;
      means for converting the utility data to a serial utility data stream; and
      at a rate corresponding to the chip clock rate, means for exclusive-OR combining the serial utility data stream with the spreading sequence to produce the spread spectrum signal; and
   means for modulating said optical signal with a combination of said spread spectrum signal and a signal carrying payload data.

14. The apparatus of claim 13 wherein said modulating means comprises:
   means for adding said spread spectrum signal to said payload data signal to form a modulation signal; and
   means for applying said modulation signal to input of an optical modulator that modulates said optical signal.

15. The apparatus of claim 13 wherein said modulating means comprises:
   means for adding said spread spectrum signal to said payload data signal to form a modulation signal; and
   means for driving a laser using said modulation signal so that said laser outputs said optical signal modulated with both said payload data and said utility data.

16. The apparatus of claim 13 wherein said modulating means comprises:
   means for driving a laser using said spread spectrum signal;
   means for modulating output of said laser using said payload data signal.

17. The apparatus of claim 13 wherein said means for generating the chip clock is configured to generate a clock signal having a clock rate $2^{N-1}$ times a data rate of the utility data stream.

18. The apparatus of claim 13 wherein said means for modulating is configured to weight the spread spectrum signal to have an amplitude that is approximately 5% or less of an amplitude of the signal carrying the payload data utility data.

19. The apparatus of claim 13 further comprising:
   means for outputting a modulated optical signal wherein modulation due to said payload data and modulation due to said utility data overlap spectrally.

20. In an optical communication receiver, an apparatus for recovering utility data from an optical signal, said apparatus comprising:
   means for accepting as input an optical signal modulated with payload data and said utility data;
   means for generating a spreading sequence on the basis of a chip clock;
   means for multiplying an electrical signal derived from said optical signal by the spreading sequence to produce an analog signal, said electrical signal carrying both said payload data and said utility data;
   means for converting the analog signal to a digital signal;
   means for analyzing the digital signal with a correlator process to produce a phase adjustment that adjusts a phase of the spreading sequence until a peak is achieved indicating alignment of the spreading sequence to the electrical signal;
   means for adjusting a phase of the chip clock based on the phase adjustment; and
   means for recovering said payload data from said optical signal.

21. In an optical communication transmitter system, an apparatus for superimposing utility data on an optical signal, said apparatus comprising:
   a spread spectrum processing block that spreads said utility data using a spreading sequence to generate a spread spectrum signal, wherein the spread spectrum processing block comprises:
      a chip clock unit configured to generate a chip clock at a chip frequency corresponding to a rate of a pseudo-random spreading sequence;
      a pseudo-random sequence generator configured to generate the spreading sequence based on the chip clock;
      a parallel-to-serial converter configured to convert the utility data to a serial utility data stream;
      an exclusive-OR unit configured to combine the serial utility data stream with the spreading sequence to produce the spread spectrum signal; and
   a modulation system that modulates said optical signal using a signal carrying payload data and said utility data as spread by said spread spectrum processing block.

22. The apparatus of claim 21 wherein said modulation system comprises:
   a summer that adds said spread spectrum signal to said payload data to form a modulation signal; and
   an optical modulator that modulates said optical signal responsive to said modulation signal.

23. The apparatus of claim 21 wherein said modulation system comprises:
   a summer that adds said spread spectrum signal to said payload data to form a modulation signal; and
   wherein a laser is driven using said modulation signal so that said laser outputs said optical signal modulated with both said payload data and said utility data.

24. The apparatus of claim 21 wherein said modulation system comprises:
   an optical modulator that modulates output of a laser using said payload data signal; and
   wherein said laser is driven using said spread spectrum signal.

25. The apparatus of claim 21 wherein said modulation system imposes modulation on said optical signal such that modulation due to said payload data and modulation due to said utility data overlap spectrally.

26. The apparatus of claim 21, wherein said chip clock unit is configured to generate a clock signal having a clock rate $2^{N-1}$ times a data rate of the utility data stream.

27. The apparatus of claim 21, wherein the modulation system is configured to weight the spread spectrum signal to have an amplitude that is approximately 5% or less of an amplitude of the signal carrying the payload data.

28. In an optical communication receiver, an apparatus for recovering utility data from an optical signal, said apparatus comprising:
   an input that accepts an optical signal modulated with payload data and said utility data;
   a spread spectrum processing block that uses a spreading sequence to recover said utility data from an electrical signal derived from said optical signal, wherein the spread spectrum processing block comprises:

a pseudo-random sequence generator configured to generate a spreading sequence on the basis of a chip clock;

an analog multiplier configured to multiply an electrical signal derived from said optical signal by the spreading sequence to produce an analog signal, said electrical signal carrying both said payload data and said utility data;

a controller configured to analyze a digital signal derived from the analog signal with a correlator process to produce a phase adjustment that adjusts a phase of the spreading sequence until a peak is achieved indicating alignment of the spreading sequence to the electrical signal; and a phase adjustor configured to adjust a phase of the chip clock based on the phase adjustment.

* * * * *